(12) United States Patent
Leijon et al.

(10) Patent No.: US 7,304,399 B2
(45) Date of Patent: Dec. 4, 2007

(54) WAVE POWER ASSEMBLY

(75) Inventors: Mats Leijon, Uppsala (SE); Hans Bernhoff, Uppsala (SE)

(73) Assignee: Seabased AB, Uppsala (SE)

( * ) Notice: Subject to any disclaimer, the term of this patent is extended or adjusted under 35 U.S.C. 154(b) by 150 days.

(21) Appl. No.: 10/550,901

(22) PCT Filed: Mar. 22, 2004

(86) PCT No.: PCT/SE2004/000421

§ 371 (c)(1),
(2), (4) Date: Sep. 27, 2005

(87) PCT Pub. No.: WO2004/085843

PCT Pub. Date: Oct. 7, 2004

(65) Prior Publication Data

US 2007/0090652 A1    Apr. 26, 2007

(30) Foreign Application Priority Data

Mar. 27, 2003   (SE)   .................................... 0300870

(51) Int. Cl.
*F03B 13/10*   (2006.01)
*F03B 13/12*   (2006.01)
*H02P 9/04*    (2006.01)

(52) U.S. Cl. .......................................... 290/42; 290/53
(58) Field of Classification Search ............. 290/43, 290/42, 53, 54
See application file for complete search history.

(56) References Cited

U.S. PATENT DOCUMENTS

| | | | | |
|---|---|---|---|---|
| 3,696,251 A | * | 10/1972 | Last et al. ................... | 290/53 |
| 4,291,234 A | * | 9/1981 | Clark ......................... | 290/53 |
| 4,355,511 A | * | 10/1982 | Jones ......................... | 60/507 |
| 4,434,375 A | * | 2/1984 | Taylor ........................ | 290/53 |
| 4,754,157 A | * | 6/1988 | Windle ....................... | 290/53 |
| 5,176,552 A | * | 1/1993 | Kuboyama et al. .......... | 441/16 |
| 6,020,653 A | * | 2/2000 | Woodbridge et al. ........ | 290/53 |
| 6,229,225 B1 | * | 5/2001 | Carroll ....................... | 290/53 |
| 6,392,314 B1 | * | 5/2002 | Dick ........................... | 290/53 |
| 6,695,536 B2 | * | 2/2004 | Sanchez Gomez .......... | 405/76 |
| 7,164,212 B2 | * | 1/2007 | Leijon et al. ................. | 290/42 |

FOREIGN PATENT DOCUMENTS

GB    2272026 A1    5/1994

* cited by examiner

*Primary Examiner*—Julio C. Gonzalez
(74) *Attorney, Agent, or Firm*—The Maxham Firm

(57) ABSTRACT

A wave power assembly having a hull and a linear electric generator. The rotor is connected to the hull by connection means so that lifting force is transferred from the hull to the rotor. Spring means exert a force on the rotor that is counter-directed the lifting force. The spring means is arranged to, at a motion amplitude corresponding to 50% of the maximum length of stroke of the rotor, exert a force, the size of which varies by a factor of 2.5 as a maximum. The invention also relates to a wave power plant built up from wave power assemblies according to the invention. Furthermore, the invention relates to a use of the wave power assembly and a method for the generation of electric energy.

29 Claims, 5 Drawing Sheets

WAVE POWER ASSEMBLY

FIELD OF THE INVENTION

The present invention relates in a first aspect to a wave power assembly, comprising a hull and a linear electric generator, the rotor of which by means of connection means is connected to the hull and the stator of which is arranged to be anchored at a sea/lake bottom, which assembly also comprises spring means arranged to exert a force on the rotor, which force during at least a part of the motion of the rotor is counter-directed the lifting force exerted by the hull on the rotor, the rotor as a consequence of motions of the hull and the force exerted by the spring means being arranged to execute a reciprocating motion between two end positions defining the length of stroke of the rotor, the assembly being arranged for a fixed maximum length of stroke. The direction of motion of the rotor defines the longitudinal direction of the generator and a plane perpendicular to the direction of motion defines the cross direction of the generator.

In a second aspect, the invention relates to a wave power plant comprising a plurality of wave power assemblies according to the invention.

In a third aspect, the invention relates to the use of the invented wave power assembly in order to produce electric current.

In a fourth aspect, the invention relates to a method for the generation of electric energy.

In the present application, the term rotor is used for the movable part of the linear generator. Thus, it should be appreciated that the term rotor does not relate to a rotary body but a linearly reciprocating body. Thus, by the direction of motion of the rotor, reference is made to the linear direction of motion thereof.

The wave power assembly according to the invention is primarily intended for but not limited to applications up to 500 kW.

The fact that the stator is arranged for anchorage at the bottom of the sea does not necessarily imply that it is situated on the same. Neither that it has to be stiffly connected to the bottom of the sea. Thus, the stator construction may naturally be floatingly supported and the anchorage may only consist of a line or the like, which prevents the assembly to drive away.

BACKGROUND OF THE INVENTION

Wave motions in the sea and large lakes are a potential energy source which till now is very little utilized. The available wave energy depends on the wave height and is naturally different for different locations. The average wave energy during a year is dependent on the different wind conditions, which are highly influenced by the distance of the location from the nearest coast. Measurements have, among other things, been made in the North Sea. At a measuring point approx. 100 km to the west of the coast of Jutland where the depth was approx. 50 m, measurings of the wave height have been made.

In order to utilize the energy that is available by the motions of the sea waves, different types of wave power assemblies for the generation of electric power have been proposed. However, these have not succeeded to successfully compete with conventional electric power production. Wave power plants realized hitherto have in the main been test plants or used for local energy supply to navigation buoys. In order for commercial electricity production to be feasible, and thereby give access to the large energy reserve available in the motions of the sea waves, it is not only required that the setting out of the assemblies is carried out in suitably located places. It is also necessary that the assembly is reliable, has high efficiency as well as low manufacturing and operating costs.

Among the feasible principles of the conversion of the wave motion energy to electric energy, a linear generator should in that connection to the largest extent meet these requirements.

The vertical motions of the hull caused by the wave motions can thereby directly be transferred to a reciprocating motion of the rotor of the generator. A linear generator may be made very robust and simple and by it being anchored at the bottom, it becomes solidly unaffectable by streams in the water. The only movable part of the generator will be the reciprocating rotor. By the few movable parts thereof and the simple constructive build-up thereof, the assembly becomes very reliable.

By, for instance, U.S. Pat. No. 6,020,653, a wave power assembly is previously known, which is based on the linear generator principle. Hence, the specification describes a generator anchored at the bottom, which generator produces electric energy from the wave motions of the sea surface. A generator coil is connected to a hull so that the coil moves up and down with the wave motions. A magnetic field acts on the coil when it moves so that an electromagnetic force is generated in the same. The magnetic field is such that it provides a uniform field having a single magnetic orientation along the length of stroke of the entire coil. The generator comprises a base plate on the bottom of the sea that carries the magnetic core in which the coil moves.

Furthermore, a wave power assembly provided with a linear electric generator is previously known by U.S. Pat. No. 4,539,485. The rotor thereof consists of a number of permanent magnets and the winding of the generator is arranged in the surrounding stator.

Further, in PCT/SE02/02405, a wave power assembly is disclosed having a linear generator in which the rotor is permanent magnetic and the stator comprises winding forming a plurality of poles distributed in the direction of motion of the rotor. A spring means is arranged in the form of a tension spring and exerts a downwardly directed tensile force on the rotor, i.e. directed against the lifting force of the hull.

When the hull is lifted by a wave, this entails that the rotor in the generator is pulled upwards. One portion of the energy generated on that occasion is converted to electric energy and one portion is accumulated in the tension spring.

When the hull then moves from a crest of a wave to a trough of a wave, the rotor is pulled downwards by the tension spring. Thereby, the energy accumulated in the spring is converted to electric energy.

When a simple mechanical tension spring is used, the conversion to electric energy will be effected non-uniformly, which creates disturbances and causes inferior conditions for the energy conversion.

The object of the present invention is, against this background, to seek to overcome said problem in a wave power assembly of the kind in question so that the conversion to electric energy is optimized.

SUMMARY OF THE INVENTION

The object set-up has in a first aspect of the invention been attained by a wave power assembly of the kind defined in the preamble of claim 1 comprising the special features of the spring means being arranged to, at a motion amplitude corresponding to 50% of the maximum length of stroke of the rotor, exert a force, the size of which varies by a factor of 2,5 as a maximum.

The solution according to the invention is based on an identification of the causes for the emergence of the disturbances and the inferior energy conversion. The causes may be derived to the functional mode of a mechanical tension spring. The spring force of such a one is normally proportional to the extension of the spring from a neutral position. Thereby, the force exerted by the spring on the rotor will vary considerable during the motion of the rotor, and thereby also the speed of the rotor. Upon upward motion of the rotor, at the beginning a relatively large portion of the energy is transferred to electric energy and only a smaller portion to the spring, since on that occasion the counter force from the same is relatively small. During the later part of the motion, the relation becomes the opposite, since the spring force then is greater. A corresponding course of events also occurs upon the downward motion. Here, a decisive cause for the non-uniform energy conversion is to be found.

Thus, based on this insight, according to the invention a spring means is used with said non-uniformity being reduced by the fact that variation of the spring force is limited. Thanks to the variation of the spring force having a maximum of 1:2,5 over said interval, the relation between the energy that is accumulated in the spring means and the energy that is converted to electric energy will vary relatively little during the motion of the rotor. The consequence becomes an improved conversion to electric energy.

The limited variation of the spring force as a function of the position of the rotor can be provided in many different ways. For instance, a very long spring may be used, which already in the rotor position that corresponds to short spring length is so energized that the tensile force amounts to half the tensile force that appears in the other end position. Another way is that the spring means is composed of a plurality of springs, which give a total spring characteristic of the desired nature.

The use of a torsion spring constitutes another feasible alternative. Furthermore, there are other types of springs than pure mechanical that advantageously may be used in order to achieve the desired force variation.

According to a preferred embodiment of the invented wave power assembly, the size of the force of the spring means varies within said interval by a factor of 1.25 as a maximum. As should have been clear from the account above, it is desirable that the force varies as little as possible during the motion. Although already a variation range of 1:2.5 implies important advantages, it is even more favourable with a closer variation range. Therefore, a variation of 1:1.25 as a maximum implies an especially favourable embodiment.

According to an additional preferred embodiment, the force is substantially constant. As should be clear from the reasoning immediately above, this constitutes the optimal embodiment with reference to the problem that the present invention is focused on.

According to an additional preferred embodiment, the spring means is arranged to, at a motion amplitude corresponding to 90% of the maximum length of stroke of the rotor, exert a force, the size of which varies by a factor of 10 as a maximum. It is true that the advantages of the invention are profited to a large extent also when the range of force-variation limitation only constitutes approx. 50% of the maximum length of stroke, since the wave motions most often are within this range. Also when the wave motions are greater than so, the effect is still attained during the greater part of the motion. However, if the range of limitation of force variation is extended in accordance with this embodiment, the advantages of the invention will be possible to be fully profited also upon very strong wave motions.

According to an additional preferred embodiment, the force varies by a factor of 1.5 as a maximum over said greater range. Thereby, an especially favourable embodiment is attained.

According to an additional preferred embodiment, the spring means comprises a gas spring. Since such a one normally has a spring force that substantially is constant independent of the degree of extension, the use of a gas spring is in this connection extraordinarily expedient.

According to an alternative embodiment, the spring means is mechanical. It is true that such a solution requires special measures in order to condition the spring characteristic. In certain applications, however, this embodiment may pres??ent an advantageously simple and reliable realization of the invention.

According to an additional preferred embodiment, the spring means has a non-linear spring characteristic. This facilitates the optimization of the force variation while taking other conditions, which influence the course of events, into consideration.

According to an additional preferred embodiment, the spring means comprises an actively controlled spring. Thereby, the alteration of the spring force can be adapted to specific circumstances that occur during the course of events, e.g. by controlling the spring force in dependence of some parameter significant for the efficiency of the energy conversion.

According to an additional preferred embodiment, the spring means comprises a plurality of springs. This is a simple method to provide the desired profile for the variation of the force.

According to an additional preferred embodiment, the spring means is arranged to, over a short distance next to the end position of the rotor that corresponds to the position of the hull on a crest of a wave, at the maximum length of stroke, exert a force that is many times greater than the maximum force below 90% of the maximum length of stroke of the rotor. Thereby, a powerful braking is attained of the upward motion of the rotor in the final phase thereof when the wave motion is such that the maximum length of stroke is utilized. By means of this braking, risks of damage are avoided in comparison with a stiff stop limiting the length of stroke.

In that connection, according to a preferred embodiment, said short distance constitutes less than 10% of the maximum length of stroke of the rotor. A braking distance of that size is sufficiently large in order to enable a reasonably smooth braking and sufficiently small in order not to have any disturbing impact on the course of motion in other respects. Preferably, said distance is less than 5% of the maximum length of stroke.

According to an additional preferred embodiment, the force increases over said short distance with decreasing distance to the end position. The braking thereby becomes harmonious in that it to start with takes place smoothly and not until quite close to the end position with full strength.

According to an additional preferred embodiment, the spring means comprises one or more separate spring elements for applying force over said short distance. In case the spring force over said distance should differ considerably from the one during the rest of the motion, one or more separate elements is a simple and expedient way to achieve this.

In that connection, according to a preferred embodiment, each separate spring element is a mechanical compression or tension spring. Such a one is suitable for the achievement of the desirable characteristic during this phase. The element may preferably consist of a rubber body.

The above-mentioned preferred embodiments of the invented wave power assembly are defined in the claims depending on claim 1.

In the second, third and fourth aspects of the invention, the object set-up has been attained by a wave power plant comprising a plurality of wave power assemblies according to the invention, by the use of a wave power plant according to the invention in order to produce electric current, and by a method for production of electric current being carried out by means of a wave power assembly according to the invention, respectively, which are defined in claims 16, 17 and 18, respectively.

By the invented wave power assembly, the invented use and the invented method, advantages of the corresponding type are gained as in the invented wave power assembly and the preferred embodiments of the same and that have been accounted for above.

The invention is explained closer by the appended detailed description of advantageous embodiment examples of the same, reference being made to the appended drawing figures.

BRIEF DESCRIPTION OF THE DRAWINGS

FIG. 1 is a schematic side view of a known wave power assembly of the type that the invention relates to.

DESCRIPTION OF ADVANTAGEOUS EMBODIMENT EXAMPLES

Figure 1:
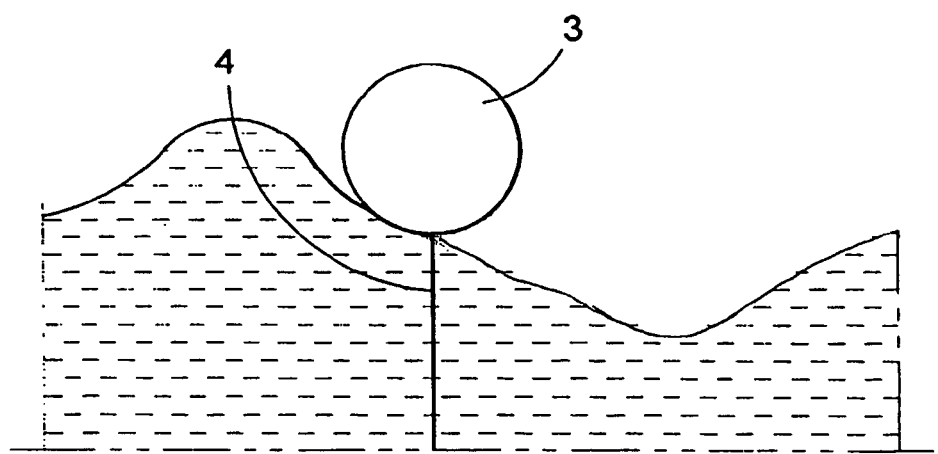
Figure 1:
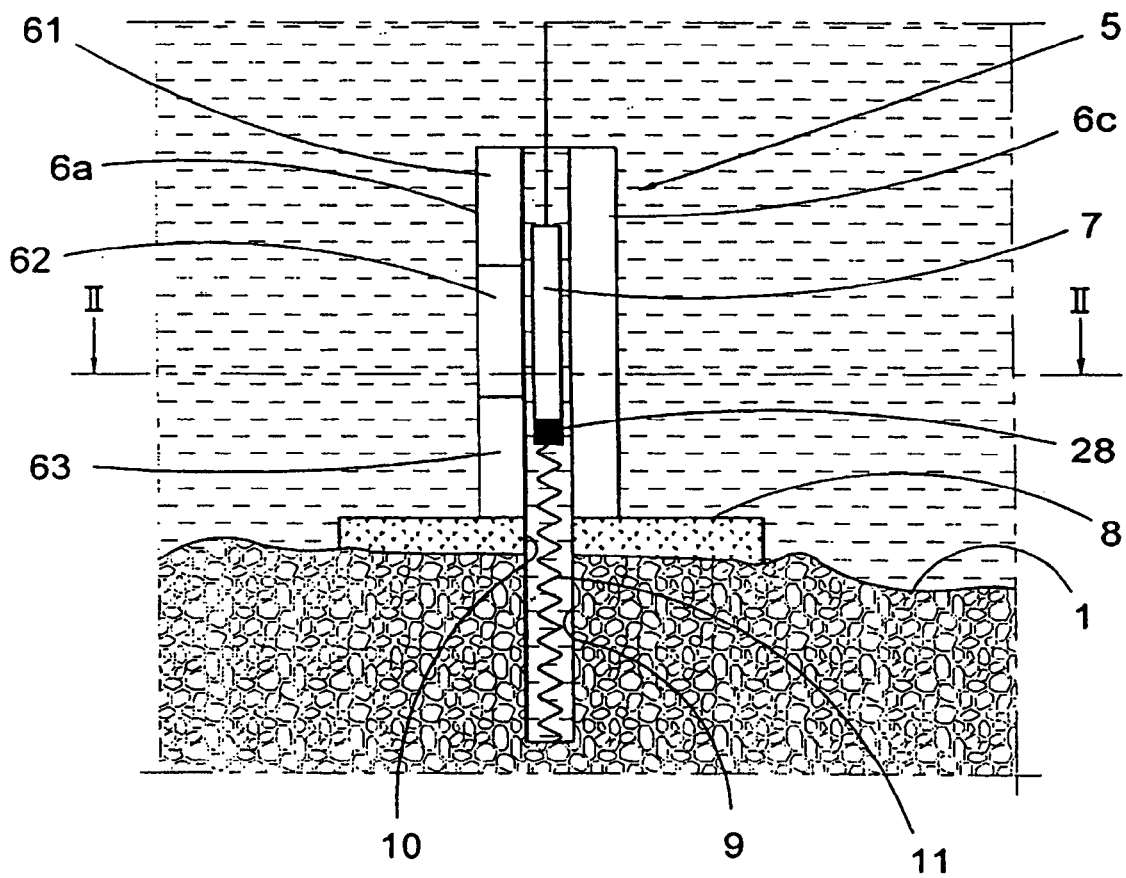

FIG. 1 illustrates the principle of a wave power assembly according to the invention. A hull 3 is arranged to float on the sea surface 2. Waves impart reciprocating vertical motion to the hull 3. At the bottom 1, a linear generator 5 is anchored via a base plate 8 fastened at the bottom, which plate may be a concrete slab. At the base plate 8, the stator 6a, 6c of the linear generator is fastened. The stator consists of four vertical column-like stator packs, only two of which are visible in the figure. In the space between the stator packs, the rotor 7 of the generator is arranged. The same is connected to the hull 3 by means of a line 4. The rotor 7 is of permanent magnetic material.

The base plate 8 has a centrally arranged hole 10, and concentrically therewith a bottom hole 9 is recessed in the bottom of the sea. The bottom hole 9 may suitably be lined. At the lower end of the bottom hole 9, a tension spring 11 is fastened, which with the other end thereof is fastened at the lower end of the rotor 7. The hole 10 in the base plate 8 and the bottom hole 9 have a diameter allowing the rotor 7 to move freely through the same.

Each stator pack 6a, 6c is composed of a number of modules. In the example shown, it is marked on the stator pack 6a how the same is divided into three vertically distributed modules 61, 62, 63.

When the hull 3 by the wave motions on the sea surface 2 moves up and down, this motion is transferred via the line 4 to the rotor 7, which receives a corresponding reciprocating motion between the stator packs. Thereby, current is generated in the stator windings. The bottom hole 9 allows the rotor to pass the entire stator in the downward motion thereof. The tension spring 11 gives an additional force to the downward motion so that the line 4 at every instant is kept stretched.

The spring may also be formed so that it in certain situations also can exert an upwardly directed force. By means of a control means 28, the spring constant of the spring may be adjusted so that resonance is attained during as large a part of the time as possible.

In order to be able to resist salt water, the stator is entirely or partly impregnated by VPI or silicone.

Figure 2:
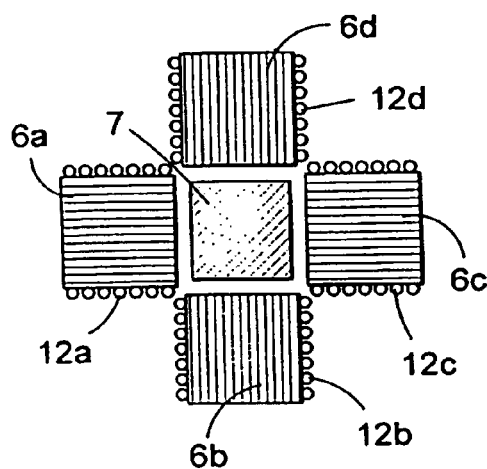
FIG. 2 is a section along the line II-II in FIG. 1.

FIG. 2 is a section along the line II-II in FIG. 1. In this example, the rotor 7 has a square cross-section and a stator pack 6a-6d is arranged at each side of the rotor 7. The winding of the respective stator pack is indicated by 12a-12d. In the figure, the orientation of the sheet-metal plates in each stator pack is also seen. The air gap between the rotor and adjacent stator packs is in the order of some mm.

Figure 3:
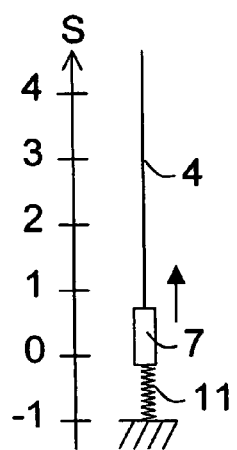
FIG. 3 shows a detail of a wave power assembly that is outside the scope of the invention.

The basic principle of the present invention is illustrated in FIGS. 3-6. FIG. 3 illustrates schematically the rotor 7 of a wave power assembly, a tension spring 11 fastened at the same and the line 4 that connects the rotor 7 with the hull. The figure is intended to illustrate the problem that the present invention is related to and shows therefore an embodiment being outside the scope of the invention. The rotor is shown in the lower maximum end position thereof. The figure is provided with a scale of lengths, where 0 represents the lower end position of the rotor and 4 the upper end position thereof. The unit of length may for the sake of simplicity be considered as metre. In the lower end position of the rotor, the spring is in the neutral position thereof and exerts no force on the rotor 7. When the rotor 7 by the lifting motion of the hull is pulled upwards, the spring 11 is energized so that the rotor at s=1 is subjected to a tensile force $F_1$ from the tension spring and at s=2 by a tensile force $F_2$ from the tension spring, etc. The force from the spring is proportional to the extension so that $F_2=2F_1$, etc.

Figure 4:
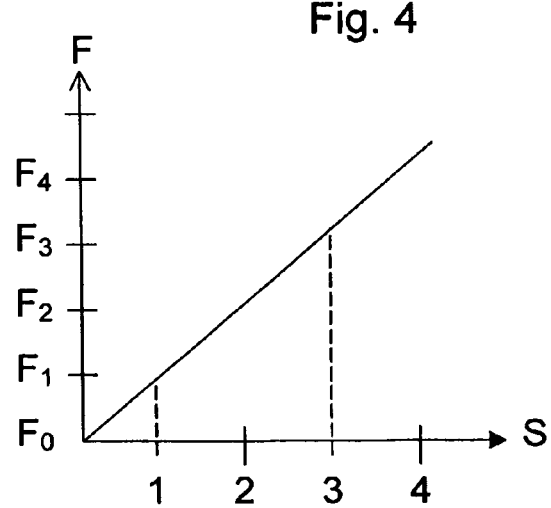
FIG. 4 is a graph illustrating the spring force as a function of motion distance in the wave power assembly according to FIG. 3.

This is illustrated in the graph in FIG. 4, with the spring force F being given as a function of the distance s of the rotor from the lower end position thereof. Accordingly, this increases powerfully during the upward motion, which results in the drawbacks mentioned in the introduction of the description. Also at a relatively moderate wave amplitude corresponding to a length of stroke of half the maximum, the force varies by a factor of 3. $F_0$=the force at the lower end position=0. $F_4$=the force at the upper end position. For an amplitude of 90% of the maximum length of stroke, the force will vary by a factor of 19.

Figure 5:
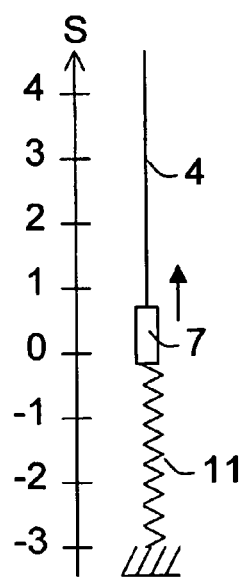
FIG. 5 shows in the same way as in FIG. 3 a corresponding detail of a wave power assembly in accordance with the invention.

FIG. 5 illustrates in a corresponding way as in FIG. 3, a wave power assembly in accordance with the invention. Here, the tension spring 11 is prestressed when the rotor is in the lower end position thereof. In that position, the spring 11 has a length of three times the length thereof at the neutral position. Thereby, already at the lower maximum end position thereof, the rotor is subjected to a force $F_0$ from the spring. When the rotor has moved 1 m upwards, with the indicated starting point, the spring force $F_1$ becomes $$F_1 = \frac{3}{2}F_0.$$

In the position 2 m above the end position, the force becomes $$F_2 = \frac{4}{2}F_0.$$

Figure 6:
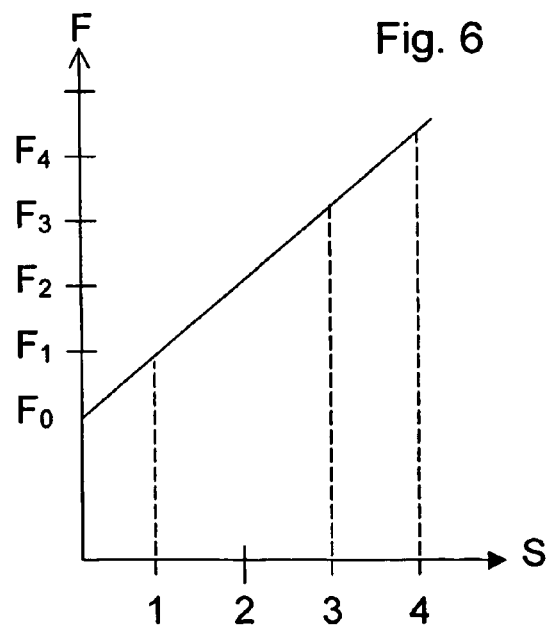
FIG. 6 is a graph corresponding to the one in FIG. 4 and related to FIG. 5.

In the graph in FIG. 6, in a corresponding way as in FIG. 4, it is illustrated how the force varies with the distance of the rotor from the lower end position thereof. The force will vary by a factor of 3 between the end positions. Upon rotor motions of half the maximum length of stroke, at most the force will vary by a factor of 1.7. Upon rotor motions corresponding to 90% of the maximum length of stroke, the force will vary by a factor of approx. 3.

Hence, an embodiment according to FIG. 5 considerably reduces the problem of varying force, though to a limited extent. It is desirable to get the inclination of the graph as flat as possible. Even flatter inclination may naturally be obtained by utilizing an even longer spring that, in the lower end position of the rotor, is more extended than in the example shown in FIG. 5. However, it may entail practical drawbacks to have a very long tension spring. The corresponding effect may in instead be obtained by letting the spring means be composed of a plurality of separate spring elements, which are connected in such a way that a flat characteristic is attained in the F-s graph.

Figure 7:
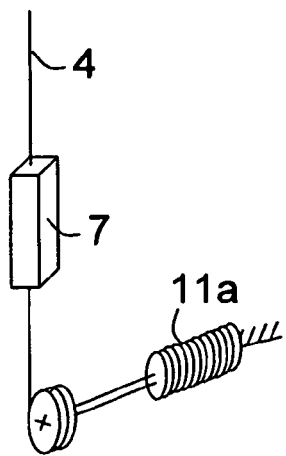
FIG. 7 shows an alternative embodiment example of a detail of the invention.

In FIG. 7, an alternative embodiment is shown, with the spring means consisting of a torsion spring 11a connected to the rotor via a motion transfer mechanism 13 that converts linear motion to rotary motion.

Figure 8:
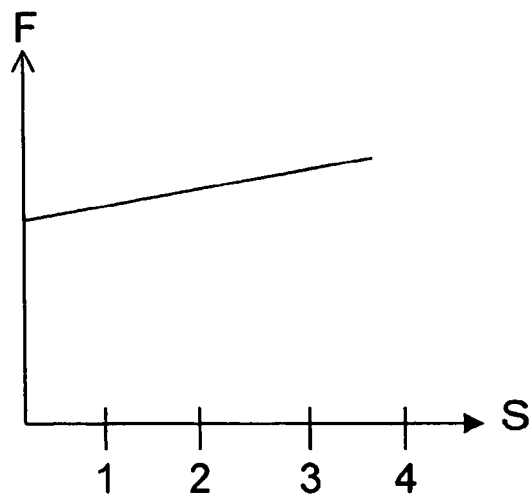
FIG. 8 is a graph corresponding to the one in FIGS. 4 and 5 and that is related to the example in FIG. 7.

By a suitable design of the torsion spring and degree of prestress thereof, a relatively flat F-s graph can be obtained as is illustrated in FIG. 8, with the spring force on the rotor between the maximum end positions thereof varying less than 20%.

Figure 9:
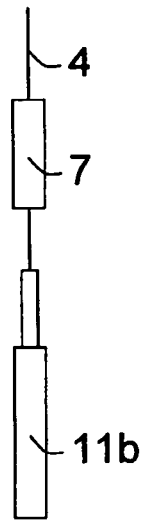
FIG. 9 shows an additional alternative embodiment example of a detail of the invention.

In FIG. 9, an additional alternative embodiment example of the invention is illustrated. The spring means here consists of a gas spring 11b. Such a one is exceptionally suitable in this connection, since gas springs are available in designs with the spring force being substantially constant, independently of the extension.

Figure 10:
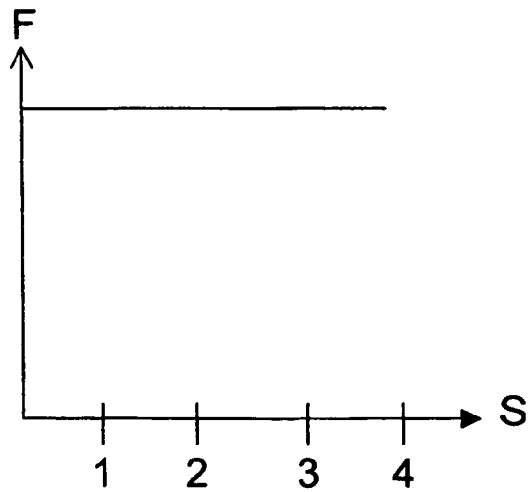
FIG. 10 is a graph corresponding to the one in FIGS. 4 and 5 and that is related to the example in FIG. 9.

In FIG. 10, this is illustrated in a graph of the corresponding type as in the previously shown graphs.

Figure 11:
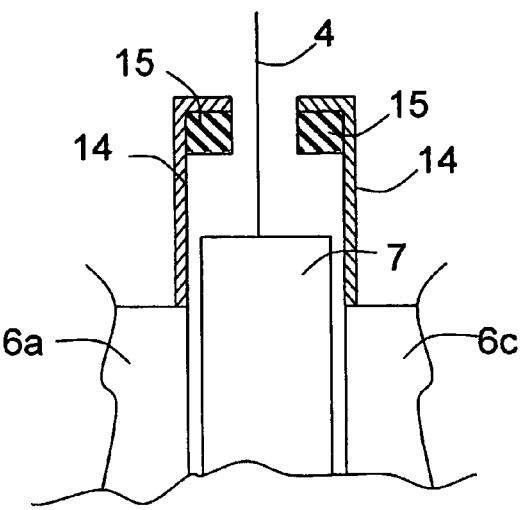
FIG. 11 shows an additional alternative embodiment example of a detail of the invention.

An additional embodiment example is shown in FIG. 11. At the upper end of the stator pack, on each stator unit a strut 14 is fastened on which a rubber body 15 each is fastened. When the rotor approaches the upper end position thereof, it will in the final stage abut against the rubber bodies 15, which on that occasion being compressed. In that connection, the rubber bodies constitute a part of the total spring means that act on the rotor 7 and that in other respects may comprise someone of the previously described spring elements. The object of the rubber bodies is to get a smooth braking of the rotor next to the end position.

Figure 12:
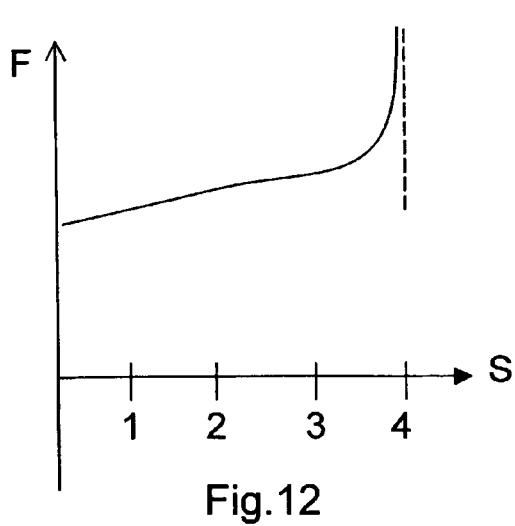
FIG. 12 is a graph corresponding to the one in FIGS. 4 and 5 and that is related to the example in FIG. 11.

From the moment when the rotor contacts the rubber bodies 15, an intense downwardly directed force is added on the rotor, which develops very strongly when it compresses the rubber bodies. This course of events is illustrated graphically in FIG. 12.

Figure 13:
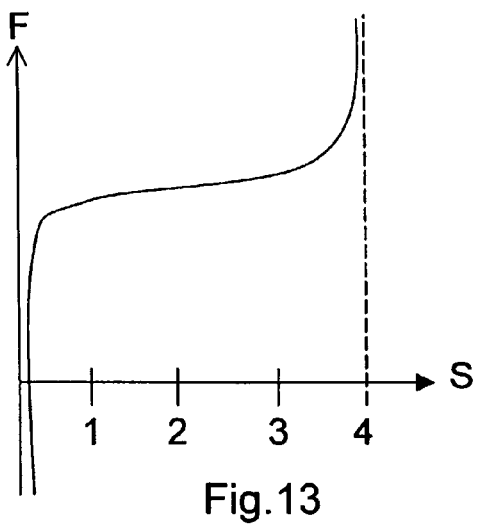
FIG. 13 is a corresponding graph illustrating an additional embodiment example.

A corresponding arrangement may be arranged at the lower maximum end position of the rotor. This embodiment is represented in the graph in FIG. 13.

It should emphasized that the description made above is based on an idealized simplification. The picture is complicated by the upward and downward motion of the hull being non-uniform, depending on the shape of the waves. Furthermore, the immersion of the hull in the water will be influenced in dependence of the size of the counter force, which, together with the elasticity of the line, imparts additional contributions of elastic forces. However, these aspects have relatively marginal impact and do not take away the relevance of the fundamental principle In FIG. 14, it is illustrated how the spring means 11c may be composed of a plurality of springs, where each spring may have a particular characteristic and where the fastening point may be on different heights. Different types of springs may be comprised and be connected to each other in various ways.

Figures 14, 15:
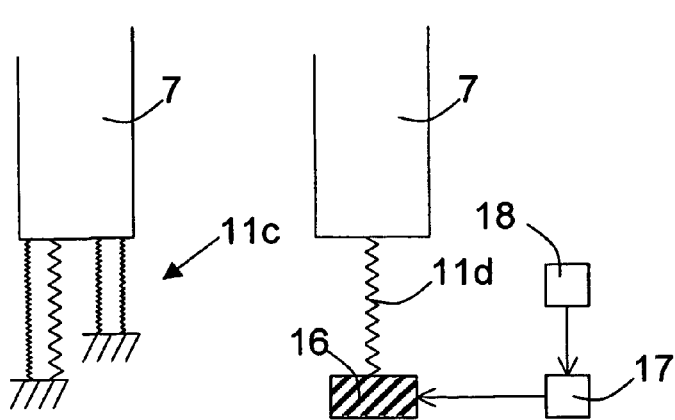
FIG. 14 illustrates an alternative embodiment example of the spring means.
FIG. 15 illustrates an additional alternative embodiment example of the spring means.

In FIG. 15, it is illustrated how the spring force of a spring means may be controlled. This is symbolized in the figure by means of a displaceable fastening support 16, the position of which is affected by a control unit 17. This may be arranged to automatically control the position of the fastening support in response to signals on a sensor unit 18, which, e.g., may detect the current generated in the stator.

Figure 16:
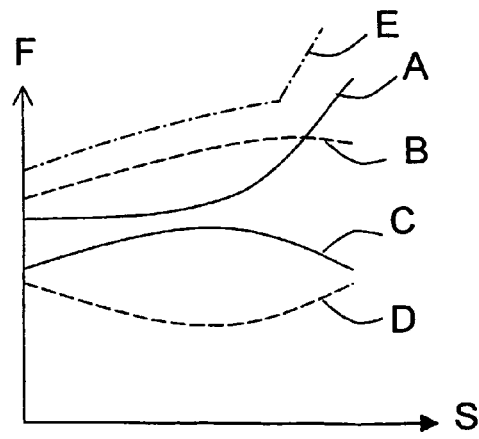
FIG. 16 is a graph illustrating alternative relationships between the position of the rotor and the spring force.

The size of the spring force as a function of the position of the rotor need not necessarily be linear. In FIG. 16, some examples are illustrated where this is not the case. Thus, the function may be such that the greater the distance of the rotor from the bottom position is, the more strongly the spring force increases, which corresponds to curve A. The opposite may also be feasible, as in curve B. The curves C and D represent courses of events with the spring force having a maximum and a minimum, respectively, at the centre position of the rotor. Curve E illustrates an additional alternative, where the function is composed of a plurality of linear sections. The illustrated functions may be obtained by suitable combination of springs and/or control of the force of the respective spring.

Figure 17:
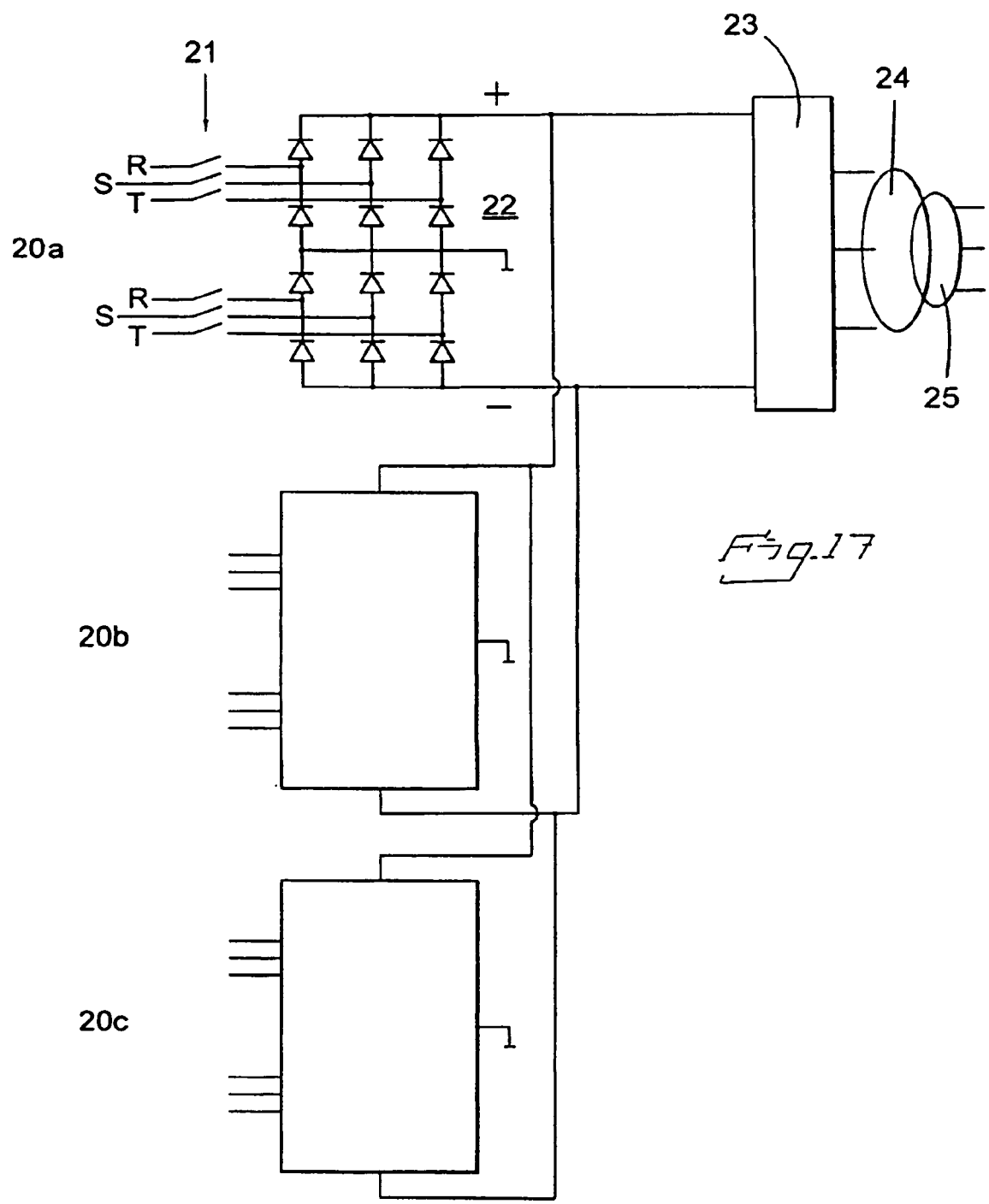
FIG. 17 is a diagram that illustrates the connection of a plurality of assemblies according to the invention into a wave power plant.

A wave power plant according to the invention consists of two or more assemblies of the above-described kind. In FIG. 17, it is illustrated how these are connected in order to deliver energy to a mains. In the example shown, the power plant consists of three assemblies symbolically indicated by 20a-20c. Each assembly is, via a breaker or contactor 21 and a rectifier 22, connected to an inverter 23, in a bipolar circuit according to the figure. In the figure, a circuit diagram is drawn only for the assembly 20a. It should be appreciated that the other assemblies 20b, 20c are correspondingly connected. The inverter 23 delivers three-phase current to the mains 25, possibly via a transformer 24 and/or a filter.

The rectifiers may be diodes that may be gate-controlled and of the type IGBT, GTO or tyristor, comprise gate-controlled bipolar components or be uncontrolled.

The voltages on the DC side may be connected in parallel, connected in series or a combination of both.

The invention claimed is:

1. A wave power assembly comprising;
   a hull;
   a linear electric generator having a rotor and a stator, said rotor being connected to said hull so that lifting force is transferred from said hull to said rotor, said stator being adapted to be anchored to a sea/lake bottom; and
   spring means configured to exert a force on said rotor, which force, during at least a part of the motion of said rotor, counter-directs the lifting force exerted on said rotor by said hull as a consequence of the motion of said hull and the force exerted by said spring means, said rotor being configured to execute a reciprocating motion between two end positions defining the length of stroke of said rotor, said rotor having a predetermined fixed maximum length of stroke;
   said spring means being configured to, at a motion amplitude corresponding to about 50% of the maximum length of stroke of said rotor, exert a force, the size of which varies by a factor of 2.5 as a maximum.

2. The wave power assembly according to claim 1, wherein the size of said force varies by a factor of 1.25 as a maximum.

3. The wave power assembly according to claim 2, wherein the size of said force is substantially constant.

4. The wave power assembly according to claim 1, wherein said spring means is configured to, at a motion amplitude corresponding to 90% of the maximum length of stroke of said rotor, exert a force, the size of which force varies by a factor of ten as a maximum.

5. The wave power assembly according to claim 2, wherein said spring means is configured to, at a motion amplitude corresponding to 90% of the maximum length of stroke of said rotor, exert a force, the size of which force varies by a factor often as a maxunum.

6. The wave power assembly according to claim 3, wherein said spring means is configured to, at a motion amplitude corresponding to 90% of the maximum length of stroke of said rotor, exert a force, the size of which force varies by a factor of ten as a maximum.

7. The wave power assembly according to claim 4, wherein said spring means is arranged to, at a motion amplitude corresponding to 90% of the maximum length of stroke of said rotor, exert a force, the size of which varies by a factor of 1.5 as a maximum.

8. The wave power assembly according to claim 5, wherein said spring means is arranged to, at a motion amplitude corresponding to 90% of the maximum length of stroke of said rotor, exert a force, the size of which varies by a factor of 1.5 as a maximum.

9. The wave power assembly according to claim 6, wherein said spring means is arranged to, at a motion amplitude corresponding to 90% of the maximum length of stroke of said rotor, exert a force, the size of which varies by a factor of 1.5 as a maximum.

10. The wave power assembly according to claim 1, wherein said spring means comprises a gas spring.

11. The wave power assembly according to claim 1, wherein said spring means comprises a mechanical spring.

12. The wave power assembly according to claim 1, wherein said spring means has a non-linear spring characteristic.

13. The wave power assembly according to claim 1, wherein said spring means comprises an actively controlled spring.

14. The wave power assembly according to claim 1, wherein said spring comprises a plurality of springs.

15. The wave power assembly according to claim 1, wherein said spring means is configured to, over a short distance next to the end position of said rotor that corresponds to the position of said hull on a crest of a wave, at the maximum length of stroke, exert a force that is many times greater than the maximum force below a motion amplitude of 90% of the maximum length of stroke of said rotor.

16. The wave power assembly according to claim 4, wherein said spring means is configured to, over a short distance next to the end position of said rotor that corresponds to the position of said hull on a crest of a wave, at the maximum length of stroke, exert a force that is many times greater than the maximum force below a motion amplitude of 90% of the maximum length of stroke of said rotor.

17. The wave power assembly according to claim 7, wherein said spring means is configured to, over a short distance next to the end position of said rotor that corresponds to the position of said hull on a crest of a wave, at the maximum length of stroke, exert a force tat is many times greater than the maximum force below a motion amplitude of 90% of the maximum length of stroke of said rotor.

18. The wave power assembly according to claim 15, wherein said short distance constitutes less than 10% of the maximum length of stroke of said rotor.

19. The wave power assembly according to claim 15, wherein said means is configured so that the force next to said end position increases with decreasing distance to the end position.

20. The wave power assembly according to claim 18, wherein said means is configured so that the force next to said end position increases with decreasing distance to the end position.

21. The wave power assembly according to claim 15, wherein said spring means comprises at least one separate spring element for applying force over said short distance.

22. The wave power assembly according to claim 18, wherein said spring means comprises at least one separate spring element for applying force over said short distance.

23. The wave power assembly according to claim 19, wherein said spring means comprises at least one separate spring element for applying force over said short distance.

24. The wave power assembly according to claim 21, wherein each of said separate spring elements consists of a mechanical compression or a tension spring.

25. The wave power assembly according to claim 22, wherein each of said separate spring elements consists of a mechanical compression or a tension spring.

26. The wave power assembly according to claim 23, wherein each of said separate spring elements consists of a mechanical compression or a tension spring.

27. A wave power plant comprising a plurality of wave power assemblies according to claim 1.

28. Use of a wave power assembly according to claim 1 in order to generate electric energy.

29. A method to generate electric energy by means of at least one wave power assembly according to claim 1.

* * * * *